(12) United States Patent
Behringer et al.

(10) Patent No.: US 11,698,046 B2
(45) Date of Patent: Jul. 11, 2023

(54) EGR PUMP SYSTEM AND CONTROL METHOD OF EGR PUMP

(71) Applicant: EATON INTELLIGENT POWER LIMITED, Dublin (IE)

(72) Inventors: Sarah Elizabeth Behringer, Southfield, MI (US); Douglas Anthony Hughes, Novi, MI (US); Brandon Biller, Ferndale, MI (US); Witt Thanom, Rochester Hills, MI (US)

(73) Assignee: Eaton Intelligent Power Limited, Dublin (IE)

( * ) Notice: Subject to any disclaimer, the term of this patent is extended or adjusted under 35 U.S.C. 154(b) by 12 days.

(21) Appl. No.: 17/312,197

(22) PCT Filed: Dec. 11, 2019

(86) PCT No.: PCT/EP2019/084731
§ 371 (c)(1),
(2) Date: Jun. 9, 2021

(87) PCT Pub. No.: WO2020/120614
PCT Pub. Date: Jun. 18, 2020

(65) Prior Publication Data
US 2022/0056872 A1 Feb. 24, 2022

Related U.S. Application Data

(60) Provisional application No. 62/778,346, filed on Dec. 12, 2018.

(51) Int. Cl.
*F02M 26/49* (2016.01)
*F02M 26/34* (2016.01)

(52) U.S. Cl.
CPC ............ *F02M 26/49* (2016.02); *F02M 26/34* (2016.02)

(58) Field of Classification Search
CPC ........ F02M 26/49; F02M 26/34; F02M 26/05; Y02T 10/40; F02D 41/0065; F02D 41/22
See application file for complete search history.

(56) References Cited

U.S. PATENT DOCUMENTS 6,192,686 B1 * 2/2001 Coleman ................. F02B 33/44
60/605.2
8,793,996 B2 8/2014 French

FOREIGN PATENT DOCUMENTS

| EP | 1870590 A1 | 12/2007 |
| JP | 2000008963 A | 1/2000 |
| JP | 2016056778 A | 4/2016 |

OTHER PUBLICATIONS

International Search Report and Written opinion dated Mar. 11, 2020 pertaining to PCT Application No. PCT/EP2019/084731 filed Dec. 11, 2019.

* cited by examiner

*Primary Examiner* — Xiao En Mo
(74) *Attorney, Agent, or Firm* — Merchant & Gould P.C.

(57) ABSTRACT

A method of operating exhaust gas recirculation pump for an internal combustion engine including: providing an EGR pump assembly including an electric motor coupled to a roots device having rotors, the EGR pump operably connected to an internal combustion engine; providing an system controller; providing an EGR control unit linked to the EGR pump assembly; sending a speed command from the system controller to the EGR control unit; determining if a motor temperature and module temperature is within a predetermined target; outputting a desired speed signal; determining if a motor speed is within a predetermined target; determining if a motor voltage is within a predeter- (Continued)

mined target; and outputting a current to the electric motor controlling the speed of the electric motor and regulating an EGR mass flow rate.

16 Claims, 12 Drawing Sheets

EGR PUMP SYSTEM AND CONTROL METHOD OF EGR PUMP

CROSS-REFERENCE TO RELATED APPLICATIONS

This application claims priority to U.S. provisional application No. 62/778,346 filed on Dec. 12, 2018 which are incorporated herein by reference in their entirety.

FIELD OF THE INVENTION

The invention relates to exhaust gas recirculation (EGR) pumps and control of EGR pumps.

BACKGROUND OF THE INVENTION

There are many previously known automotive vehicles that utilize internal combustion engines such as diesel, gas or two stroke engines to propel the vehicle. In some constructions an EGR (exhaust gas recirculation) loop recirculates the exhaust gas back into the engine for mixture with the cylinder charge. The EGR that is intermixed with the fresh air and fuel to the engine enhances the overall combustion of the fuel. This, in turn, reduces exhaust gas emissions.

By including a separate EGR pump an increase in fuel economy may be achieved in comparison to prior art systems that may use a more complicated turbocharger, costly EGR valves, and excessive engine exhaust pressure to drive an EGR flow. In a diesel application, a separate EGR pump may allow for removal of an EGR valve and replace a complicated variable geometry turbocharger with a fixed geometry turbocharger optimized for providing a boosted air charge. The separate EGR pump may provide reduced engine pumping work and improved fuel economy. Additionally, a separate EGR pump provides full authority control of the EGR flow rate.

SUMMARY OF THE INVENTION

In one aspect there is disclosed, a method of operating an exhaust gas recirculation pump for an internal combustion engine including: providing an EGR pump assembly including an electric motor coupled to a roots device having rotors, the EGR pump operably connected to an internal combustion engine; providing a system controller; providing an EGR control unit linked to the EGR pump assembly; sending a speed or torque command from the system controller to the EGR control unit; determining if a motor temperature and electronics power module temperature is within a predetermined target; outputting a desired speed or torque signal; determining if a motor speed is within a predetermined target; determining if a motor voltage is within a predetermined target; and outputting a current to the electric motor controlling the speed of the electric motor and regulating an EGR mass flow rate.

In another aspect there is disclosed, a method of operating an exhaust gas recirculation pump for an internal combustion engine including: providing an EGR pump assembly including an electric motor coupled to a roots device having rotors, the EGR pump operably connected to an internal combustion engine; providing a system controller; providing an EGR control unit linked to the EGR pump assembly; sending a signal in the EGR control unit from a battery power off state to an initialization state where the electric motor communicates with the EGR control unit; sending an enable signal to the electric motor placing the electric motor in a standby state wherein the electric motor is three phase shorted; sending a CAN enable signal to the electric motor placing the electric motor in an enabled state; sending a speed command from the system controller to the EGR control unit defining a speed set point; outputting a current to the electric motor maintaining the setpoint and regulating an EGR mass flow rate.

In a further aspect, there is disclosed a method of operating an exhaust gas recirculation pump for an internal combustion engine including: providing an EGR pump assembly including an electric motor coupled to a roots device having rotors, the EGR pump operably connected to an internal combustion engine; providing a system controller; providing an EGR control unit linked to the EGR pump assembly; sending a speed command from the system controller to the EGR control unit defining a speed set point; determining if the motor is in a regeneration state; determining if the motor is operating at maximum torque; outputting an overspeed warning if the motor is at risk of over speed due to maximum torque in regen; determining if an actual speed is greater than a speed limit; outputting an over speed warning if the actual speed is greater than a speed limit; outputting a current to the electric motor maintaining the setpoint and regulating an EGR mass flow rate.

DETAILED DESCRIPTION

Figure 1:
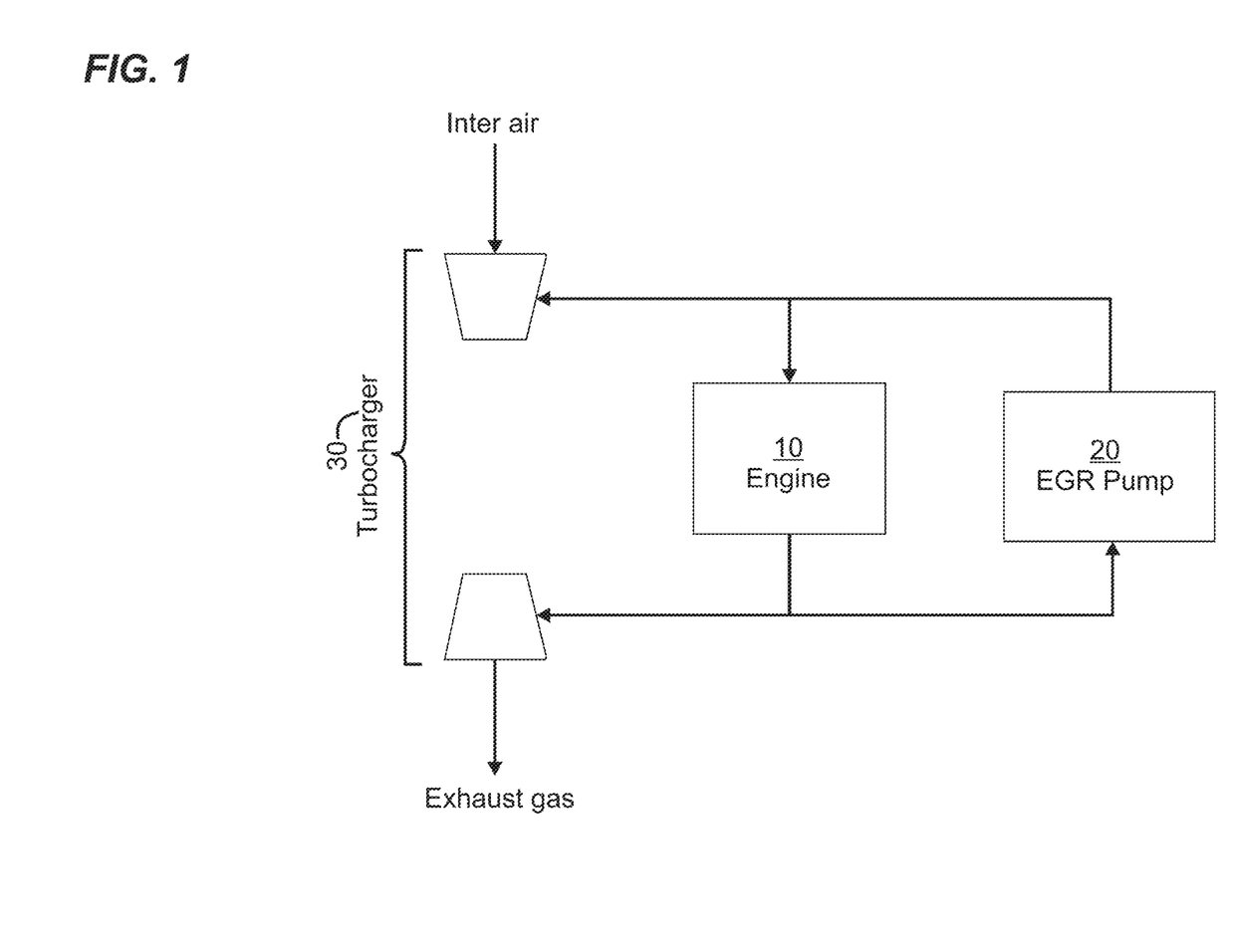
FIG. 1 is a diagram of the engine flow path including EGR pump and turbocharger.
Figure 2:
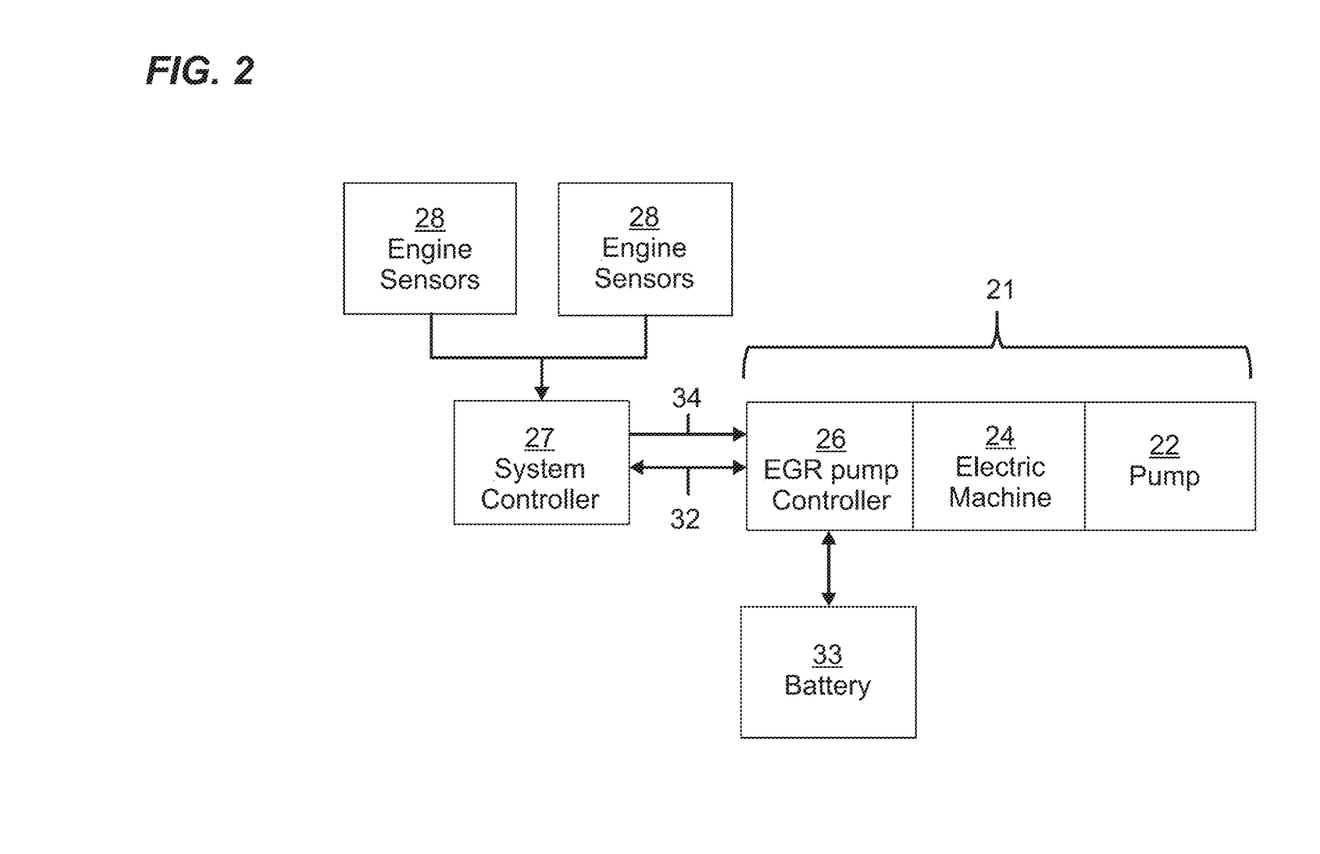
FIG. 2 is a diagram of an EGR system detailing engine sensors, ECU, battery, EGR pump controller, electric motor and EGR pump.

Referring to FIGS. 1-2, there is shown an exhaust gas recirculation pump (EGR pump) system 21.

Referring to FIG. 1, an EGR pump 20 is used to assist recirculating exhaust gas to the engine 10 for improved engine emissions and engine efficiency.

Referring to FIGS. 1-2, in order to pump EGR in an engine 10, the EGR pump 20 uses a Roots device 22 coupled to an electric motor 24 which is controlled by an electronic controller including an inverter 26. The EGR pump controller 26 provides control of EGR flow rate by managing the motor speed and in turn the pump speed. Feedback of pump or motor speed may be provided to an ECU or System Control Unit 27 to control an EGR mass flow rate. The speed feedback can be combined with various sensors 28 such as pressure and temperature sensors to calculate mass flow rate.

Figure 3:
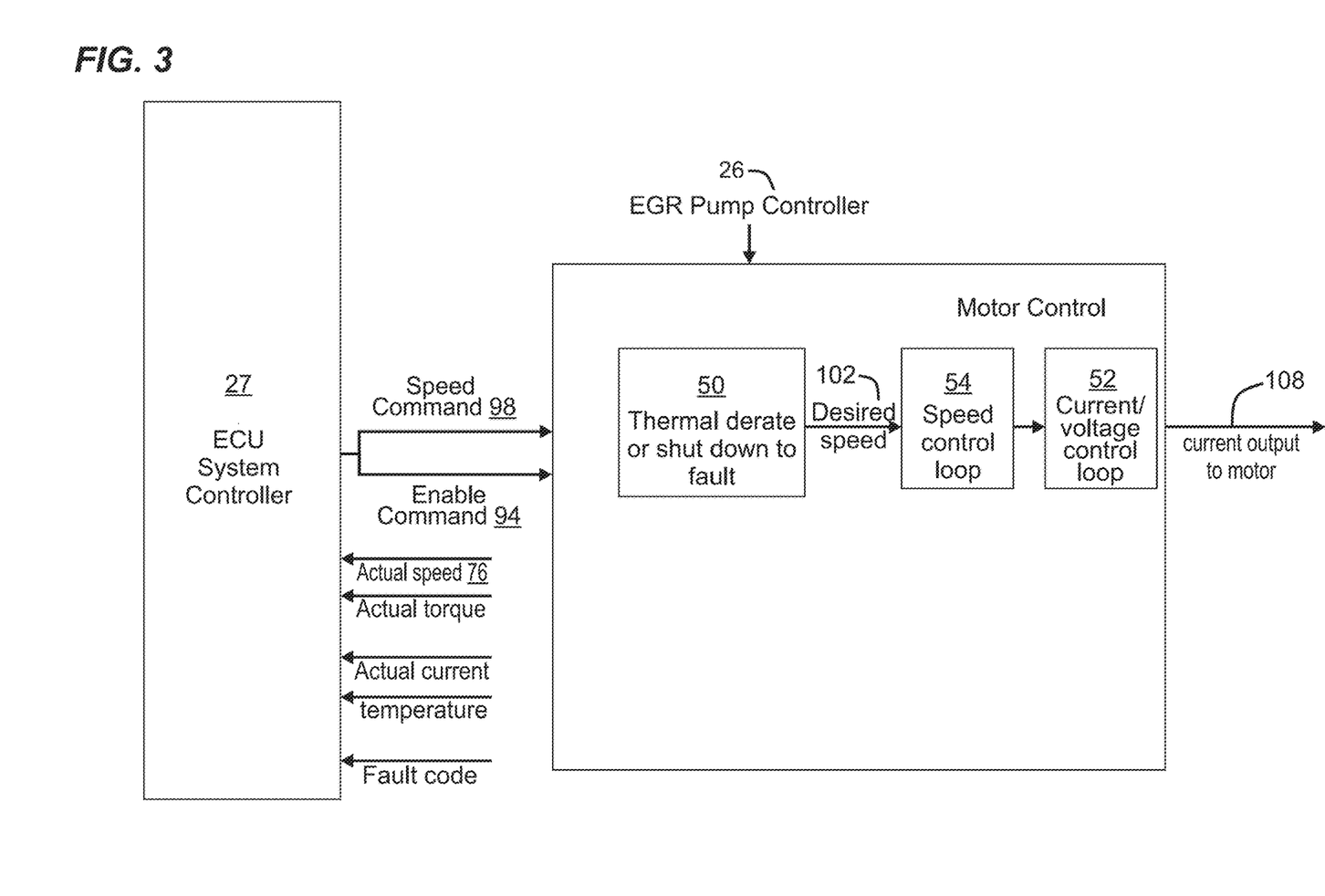
FIG. 3 is a diagram of an EGR system detailing an ECU and a speed-based EGR pump controller.

As shown in FIG. 3, the inverter and EGR pump controller 26 may include feedback of the electric motor speed, torque, current, temperature and/or fault codes for the purposes of EGR pump system diagnostics and prognostics. The EGR pump 20 can use torque feedback to adapt its behavior. The EGR pump 20 is powered by the vehicle battery. Voltage architectures above 12V may be necessary to meet the EGR pump power requirement. In one aspect, a 48V supply may be utilized.

In one aspect, the electric motor 24 is permanently coupled to pump 22 displayed in FIG. 2 and is controlled with an EGR pump controller including an inverter 26. The controller 26 is mounted on the back end of the electric motor 24. The controller 26 includes the low-level motor Field Oriented Control (FOC) controls as well as some of the system controls, including the state diagram disclosed in FIG. 4.

Figure 4:
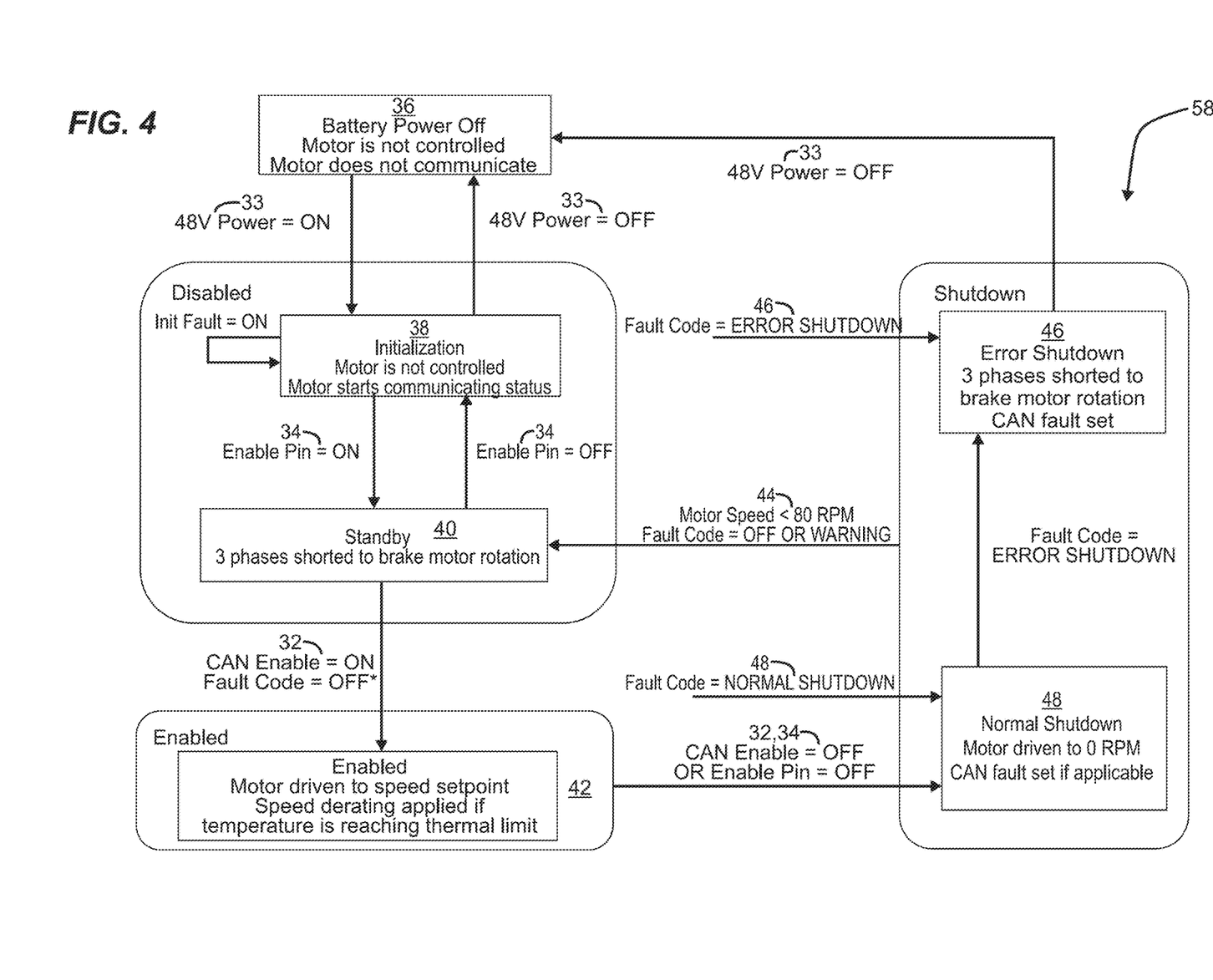
FIG. 4 is a state diagram of an EGR pump controller.

The inverter has DC supply power connections 33 to power the EGR pump controller 26 and electric motor 24, high and low CAN wires 32, and a device-specific hardwired enable line 34. The Battery Power Off state 36 corresponds to the state when the EGR pump is powered off entirely. When the 48V vehicle battery is connected, the EGR pump controller 26 will enter the initialization state 38. In this state, the motor is in a low power state and is not controlled. The motor does not build torque however it starts to communicate in this state. This includes broadcasting one or more status feedback messages. Also in this state, the EGR pump controller is initialized. The controller checks for faults during initialization, for example that all hardware components are reading the correct voltage. If any errors are detected then the initialization fault is set. If an initialization fault is set, the controller will not leave the initialization state.

If the enable pin 34 is turned on in the initialization state 38, the controller enters the standby state 40. The motor is 3-phase shorted to brake motor rotation. Once the CAN enable command is on and there are no fault codes, the controller enters the enabled state 42. In the enabled state 42, the motor will be driven to the set point communicated over CAN. The set point may be a speed or torque command. Speed derating may be applied based upon the temperature as will be discussed in more detail below. Fault conditions and fault codes are set in every state, except for Battery Power off 36. The three fault states: warning 44, error shutdown 46 and normal shutdown 48 will be discussed in more detail below.

Figure 12:
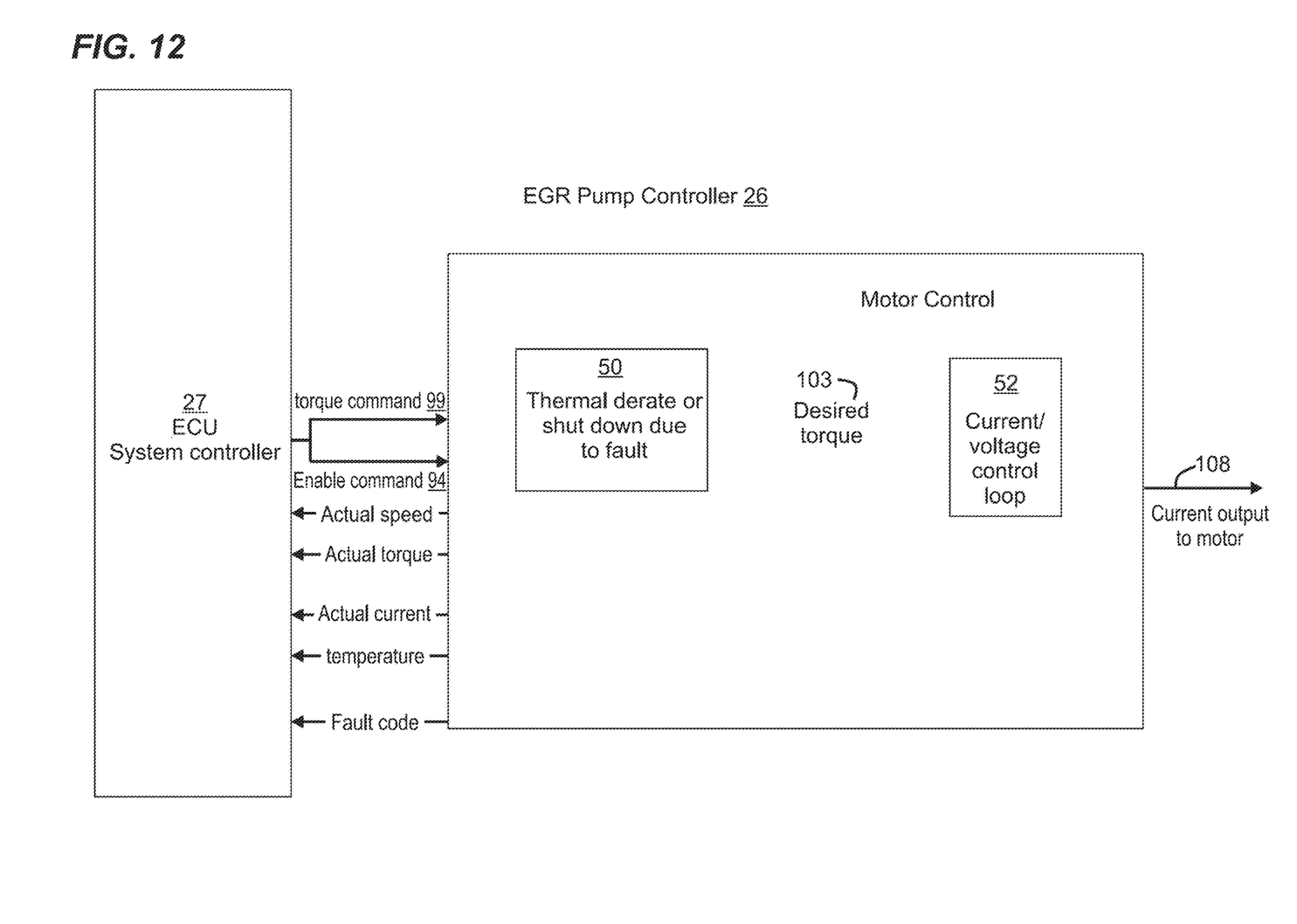
FIG. 12 is a diagram of an EGR system detailing an ECU and a torque-based EGR pump controller

Referring to FIG. 12, there is shown a variation of the speed-controlled EGR pump system diagram which uses torque control. This control method includes a torque command 99 sent from the engine controller and a desired torque 103 output from the state machine 50. The torque-controlled variation is an alternative to speed-based control or the two methods can be implemented in the same controller and enacted during different operating conditions. In the torque-controlled variation, the over speed fault discussed below is critically important to preventing motor overspeed. In contrast to speed-controlled operation, the over speed fault is not only a warning but will prevent the motor from exceeding a predetermined operating speed limit.

If the CAN enable is turned off or the enable pin is turned off while in the enabled state 42, then the EGR pump control will enter a normal shutdown mode 48 where the motor is driven to zero rpm. The normal shutdown state 48 may also be entered from any state if a fault code related to a normal shut down is generated as will be discussed in more detail below. Also in any state, an error shutdown fault signal will cause the EGR pump to enter an error shutdown mode 46 where a 3-phase short is created to brake motor rotation and a CAN fault signal is generated. Alternatively, in any state a warning signal 44 may be sent. The warning signal 44 will update CAN feedback messages, but will not cause a state change.

Figure 5:
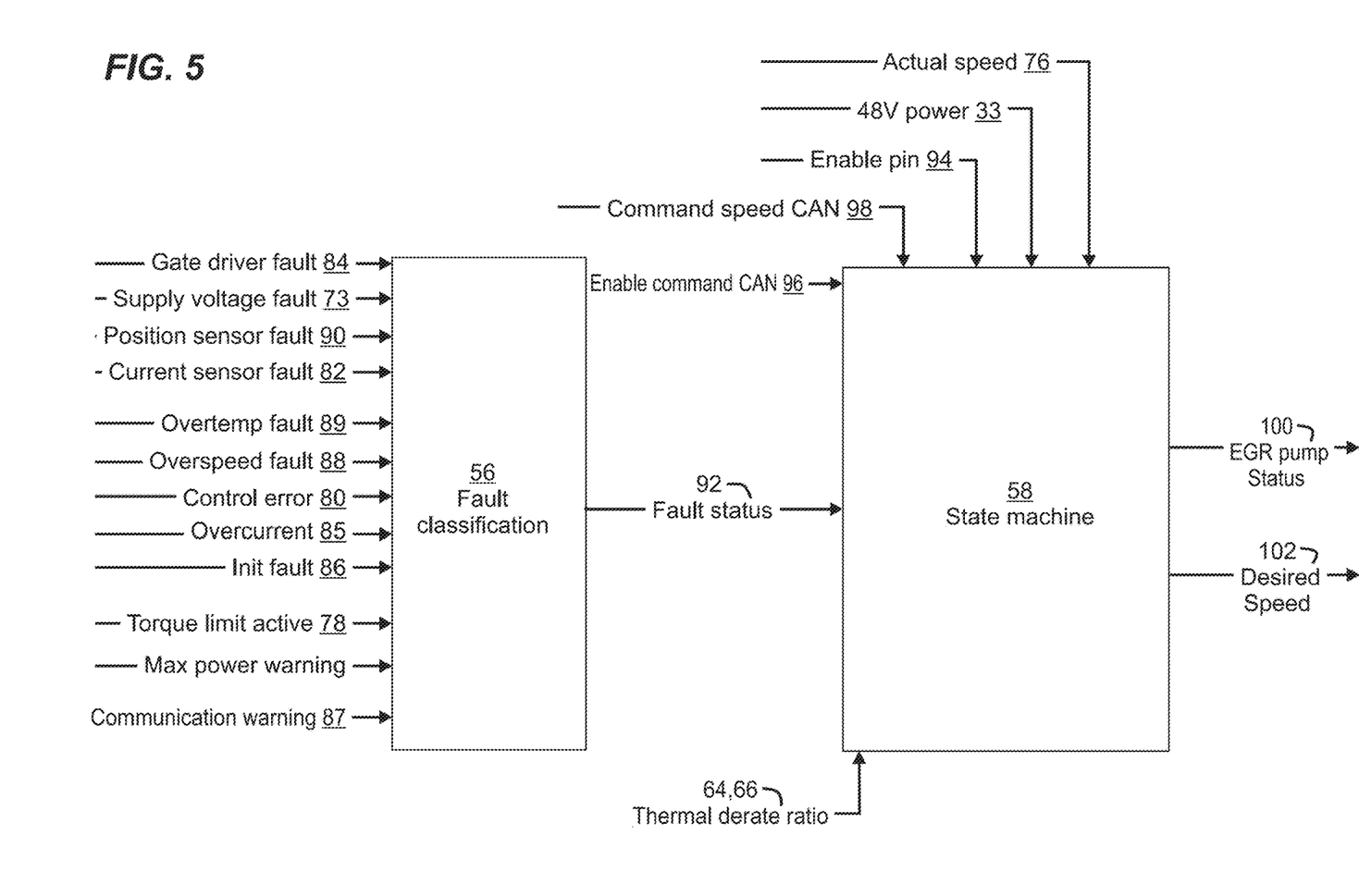
FIG. 5 is a control diagram of an EGR pump controller.

Referring to FIG. 5, there is shown a control diagram of the EGR pump controller.

The controller includes various fault classification inputs with outputs going to a state machine. Various inputs for the temperature status control logic 50, voltage status control logic 52, control error logic 54, and over speed fault detection 88 will be discussed below.

Figure 6:
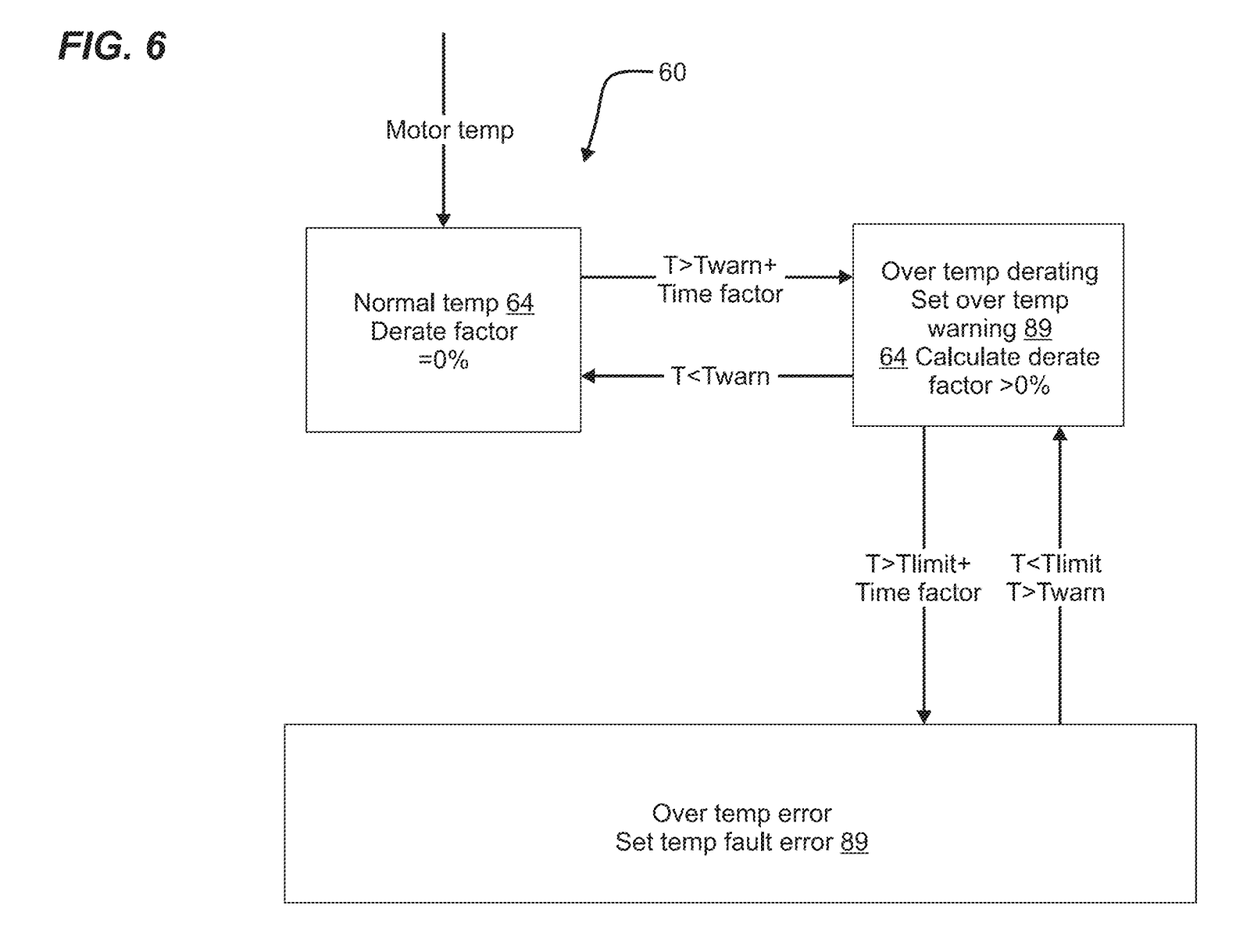
FIG. 6 is a control diagram of an EGR pump controller showing fault detection based on motor temperature.
Figure 7:
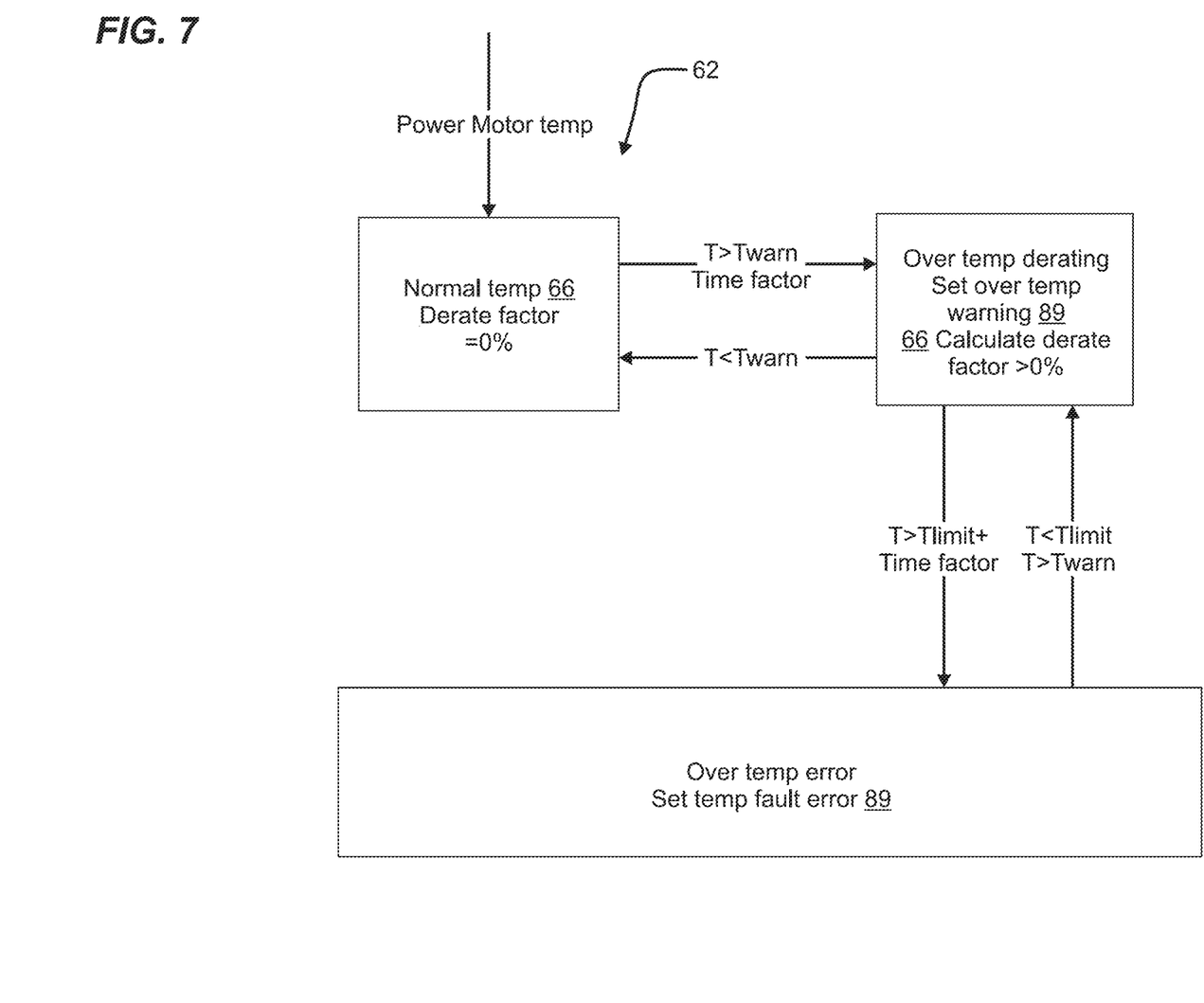
FIG. 7 is a control diagram of an EGR pump controller showing fault detection based on electronics power module temperature.

The temperature status control logic 50 includes a motor winding temp input 60 and a power module temp input 62 that is fed to control loops, best seen in FIGS. 6 and 7. The outputs of the temperature status control logic 50 include a derating ratio of the motor temp 64 and a derating ratio of the power module temp 66. The outputs are sent to the error categorization logic 56 and EGR control logic 58.

Referring to FIG. 6, there is shown a fault detection and reporting strategy for motor winding over temperature input 60. The control loop includes a normal temp operation block where a motor derating ratio 64 is set to 0%. The logic in the control loop compares the temperature of the motor winding to a preset warning temperature range (Twarn) and to a preset limit temperature (Tlimit). The Twarn and Tlimit values may vary based upon the application. If the temperature is greater than Twarn, then the controller may perform an over temperature derating of the motor by decreasing motor speed setpoint proportionally with overtemp measurement. Various derating ratios may be utilized, ranging from 0% to 75% for example. In one aspect, the motor may report status with several thermal derate steps. Once the device temperature crosses above the first derate temperature threshold, the motor will report derate level 1. If temperature climbs higher, the controller will continue to limit motor speed more aggressively and report corresponding higher derate levels. If motor temperature decreases, fault codes are turned off accordingly. This fault clearing is automatic, it does not rely on input any other controller such as the vehicle ECU.

Referring to FIG. 7, there is shown a control of the module temperature input 62. The control loop includes a normal temp operation block where a power module derating ratio 66 is set to 0%. The logic in the control loop compares the temperature of the motor winding to a preset warning temperature range (Twarn) and to a preset limit temperature (Tlimit). The Twarn and Tlimit values may vary based upon the application. If the temperature is greater than Twarn, then the controller may perform an over temperature derating of the motor by decreasing motor speed setpoint proportionally with overtemp measurement. Various derating ratios may be utilized, ranging from 0% to 75% for example. In one aspect, the motor may report status with several thermal derate steps. Once the device temperature crosses above the first derate temperature threshold, the motor will report derate level 1. If temperature climbs higher, the controller will continue to limit motor speed more aggressively and report corresponding higher derate levels. If motor temperature decreases, fault codes are turned off accordingly. This fault clearing is automatic, it does not rely on input any other controller such as the vehicle ECU.

In one aspect, the ratios of derating of the motor winding and module temperatures are compared and the lower ratio is applied to the motor. If either motor or power module reach their respective thermal shutdown limit (Tlimit) for a present time period an over temp fault 89 is created and the EGR pump control will enter the normal shutdown state 48.

Figure 8:
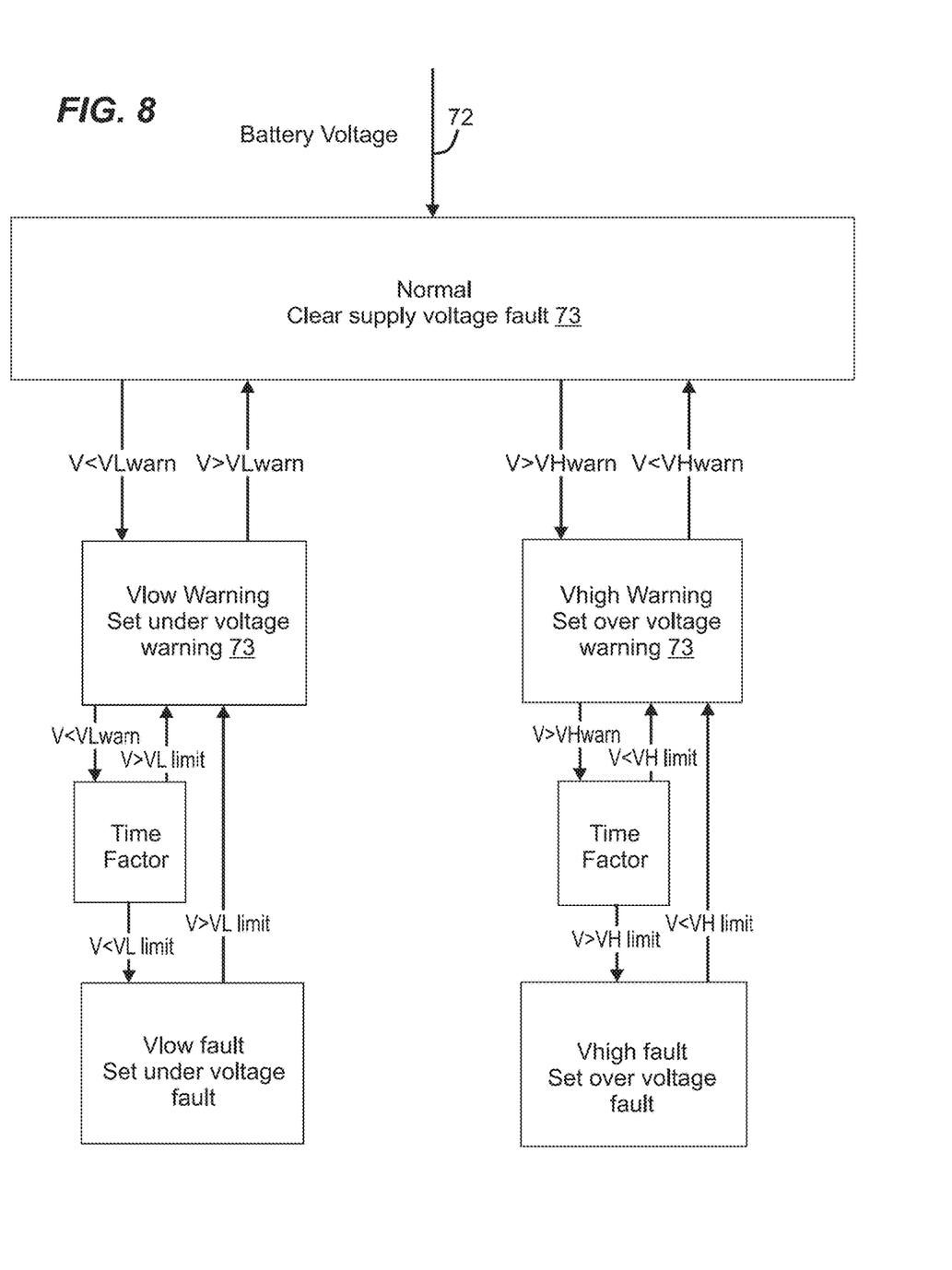
FIG. 8 is a control diagram of an EGR pump controller showing fault detection based on supply voltage.

Referring to FIG. 8, there is shown fault detection of supply voltage input errors 72. On a vehicle the supply voltage is typically provided by a battery. The output Supply Voltage Fault 73 is sent to the error categorization logic 56, best shown in FIG. 5.

The control loop includes a normal voltage operation block where no Supply voltage fault 73 is set. The logic in the control loop compares the voltage of the motor for over and under voltage conditions.

The logic in the control loop compares the voltage of the motor to a preset warning voltage range (VLwarn and VHwarn) and to a preset limit voltage (VLlimit and VH limit). The VLwarn, VHwarn, VLlimit and VHlimit values may vary based upon the application and may be for example 24-42 V, 52-54 V, less than 24V and greater than 54V, respectively.

If the supply voltage is lower than VLwarn then a warning signal fault 73 is generated. If the voltage is lower than VLlimit and remains lower than VLlimit for a preset time factor, then a V low fault 73 is generated. The V low fault 73 will cause the EGR pump controller to enter the normal shutdown state 48. If the voltage is greater than VHwarn then a warning signal fault 73 is generated. If the voltage is greater than VHlimit and remains greater than VHlimit for a preset time factor, a V high fault 73 is generated and the EGR pump controller enters the error shutdown state 46. If supply voltage returns to normal, less than VHwarn but more than VLwarn, all the Supply voltage fault code 73 is cleared automatically.

Figure 9:
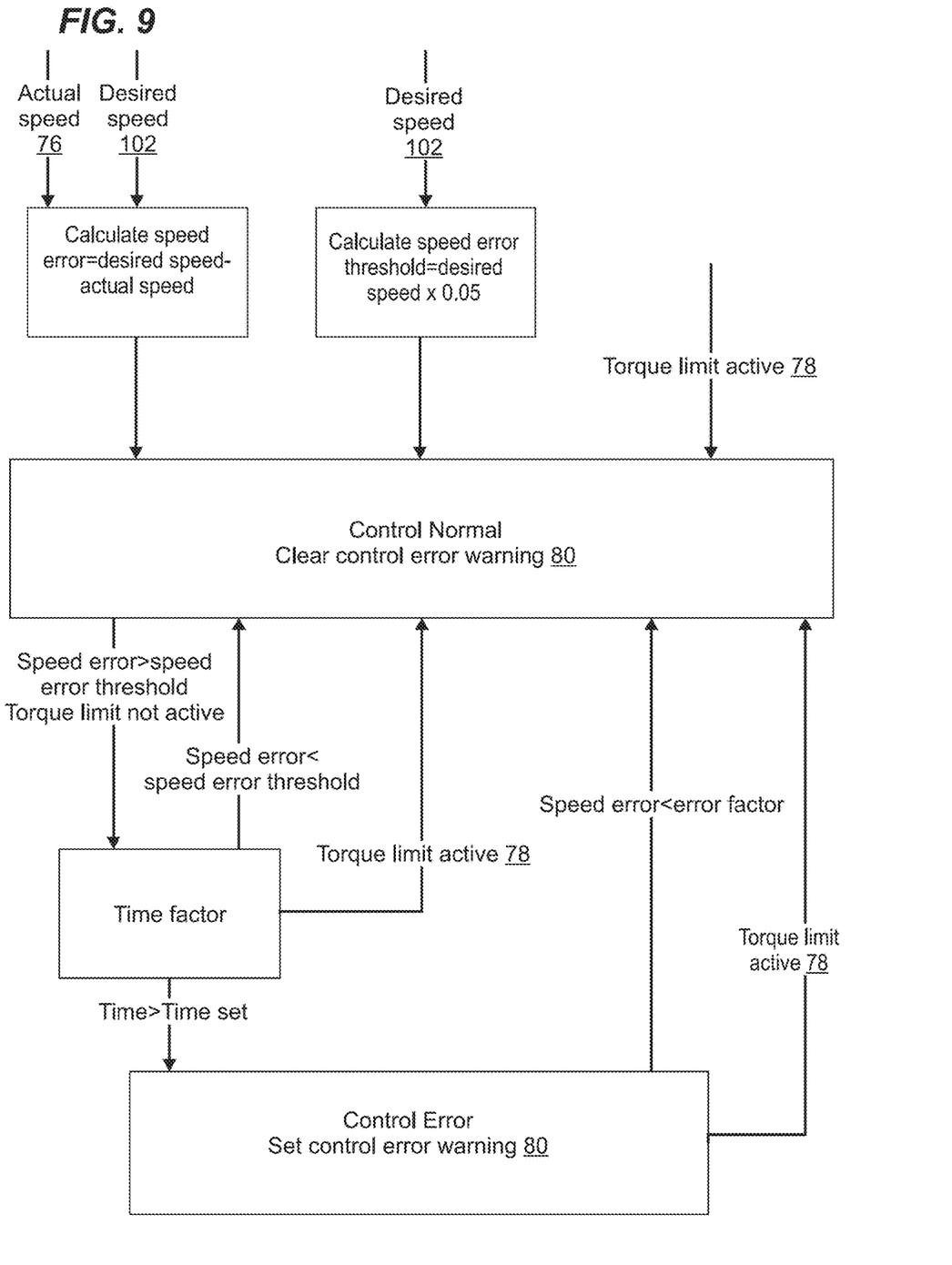
FIG. 9 is a control diagram of an EGR pump controller showing fault detection based on speed control error.

Referring to FIG. 9, there is shown fault detection based on speed control error logic 54. The inputs include a desired speed 102 that is generated from the ECU an actual speed 76 and a torque limit active signal 78. The torque limit active signal is set true when the motor has reached its maximum calibrated current. The outputs of the control error logic 54 include a control error signal 80 that is sent to the error categorization logic 56, best shown in FIG. 5.

Initially, a speed error is calculated by subtracting the actual speed 76 from the desired speed. A speed error threshold is then calculated by multiplying the desired speed by a preset factor such as 0.05. A preset constant value is used for the speed error threshold at low speed operation.

The control loop includes a normal control operation block where no Control error warning is set. The logic in the control loop compares the speed error and speed error threshold. When the torque limit is not active the speed error is compared to the speed error threshold. If the speed error is greater than the speed error threshold and a certain amount of time has passed greater than Tset a control error signal is generated. If the torque limit is no longer active or if the speed error becomes less than the speed error threshold, then the error signal is turned off automatically.

Figure 11:
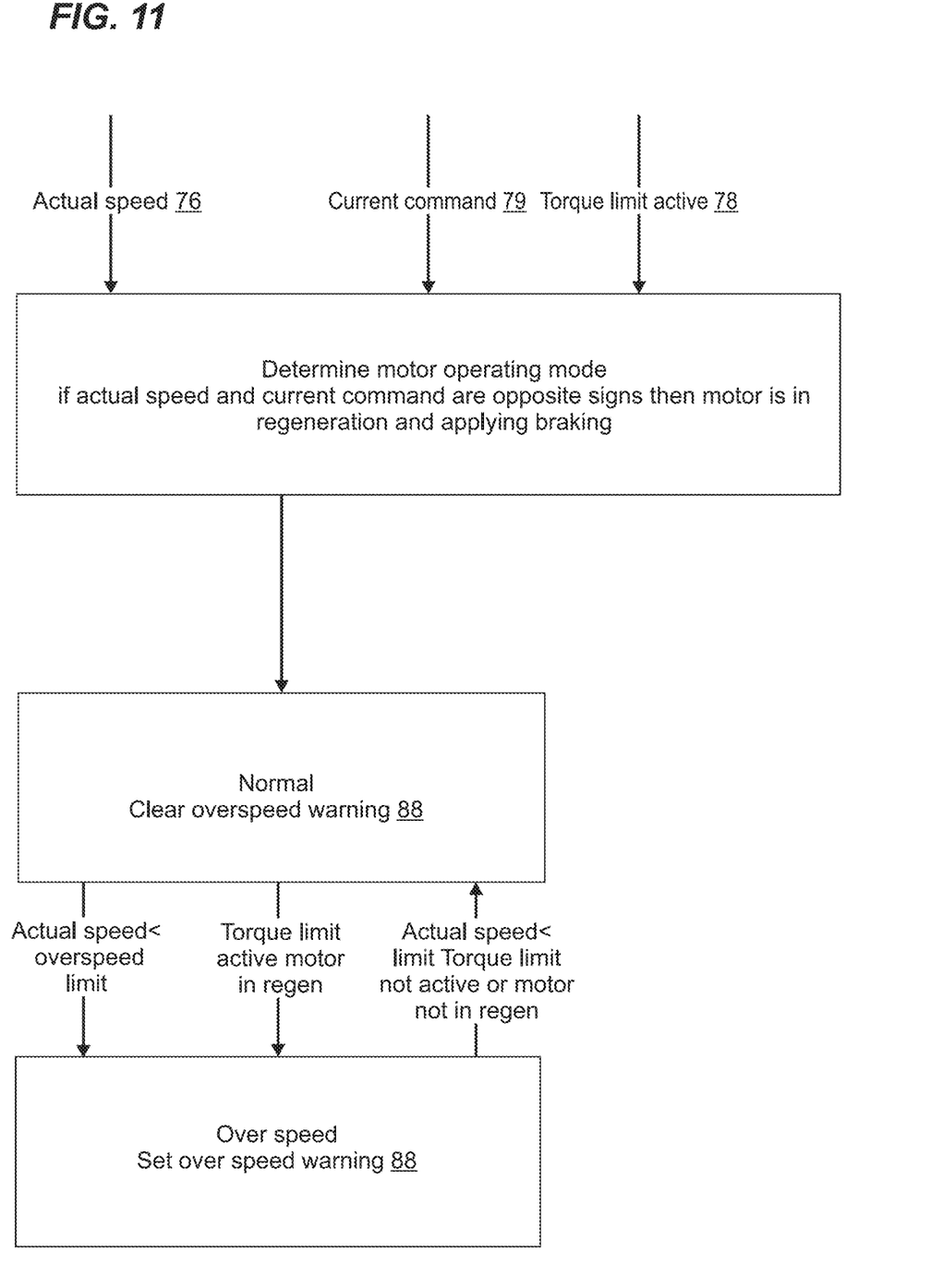
FIG. 11 is a control diagram of an EGR pump controller showing fault detection based on overspeed.

Referring to FIG. 11, there is shown a strategy for prediction and detection of an overspeed fault. The inputs include actual speed, current command, and torque limit active. The current command 79 originates from the current control loop 52. The torque limit active signal 78 is set true when the motor has reached its maximum calibrated current. The output is the overspeed warning 88, which is sent to fault categorization logic 56, best shown in FIG. 5.

Initially it is determined if the motor is operating in motoring (motor accelerating pump) or regen (motor braking EGR pump as exhaust gases work to accelerate pump.) If actual speed 76 and current command 79 have the same sign, the motor is determined to be motoring, if they are opposite the motor is determined to be regenerating. In the regen condition, there is a unique risk of over speed to the EGR pump. If it is detected that torque limit is active and the motor is in regen, then the Over speed warning 88 is set. This warning can also be set if Actual speed 76 exceeds the over speed limit. The over speed limit is a value that is a preset threshold above the normal operating speed range. If the overspeed limit is not reached and the controller does not detect torque limit active during regen, then the overspeed warning is cleared automatically. The overspeed warning condition does not affect motor command, it is only a warning that is communicated to the system controller (ECU) over CAN.

Again referring to FIG. 5, the fault classification logic 56 includes multiple inputs including supply voltage fault 73, over temp fault 89, control error 80, current sensor fault 82, over current fault 85, gate driver fault 84, and initialization fault 86, over speed fault 88, position sensor fault 90, communication warning 87, and torque limit active 78. The output error status 92 is sent to the EGR control logic 58.

The Gate driver fault 84 is generated by the gate driver chip; it detects failure in the hardware or in the execution of the current control loop 52. This type of error inhibits inability for the motor controls to function properly, so it will immediately induce an Error Shutdown type fault 46.

The current sensor fault 82 is generated when the current exceeds a preset maximum threshold or no current sensor signal is detected for a preset period of time. This type of error inhibits inability for the motor controls 52 to function properly, so it will induce an Error Shutdown type fault 46.

The position sensor fault 90 is set when the position sensor generates an error code or no position information is available. It may be checked during initialization or during operation. This type of error inhibits the ability for the motor controls 52 to function properly, so it will induce an Error Shutdown type fault 46.

The over current warning 85 is set when current sensor feedback crosses an over current warning threshold. The Over current fault is set when current sensor feedback crosses a higher over current fault threshold and sustains the out of rage value for preset period of time. The over current warning does not affect motor target speed, it only sends a message over CAN. The fault will induce a normal shutdown 48.

The Communication warning 87 is set when the EGR pump does not detect a CAN message received for a preset period of time. The Communication warning does not affect motor target speed, it only sends a message over CAN.

Figure 10:
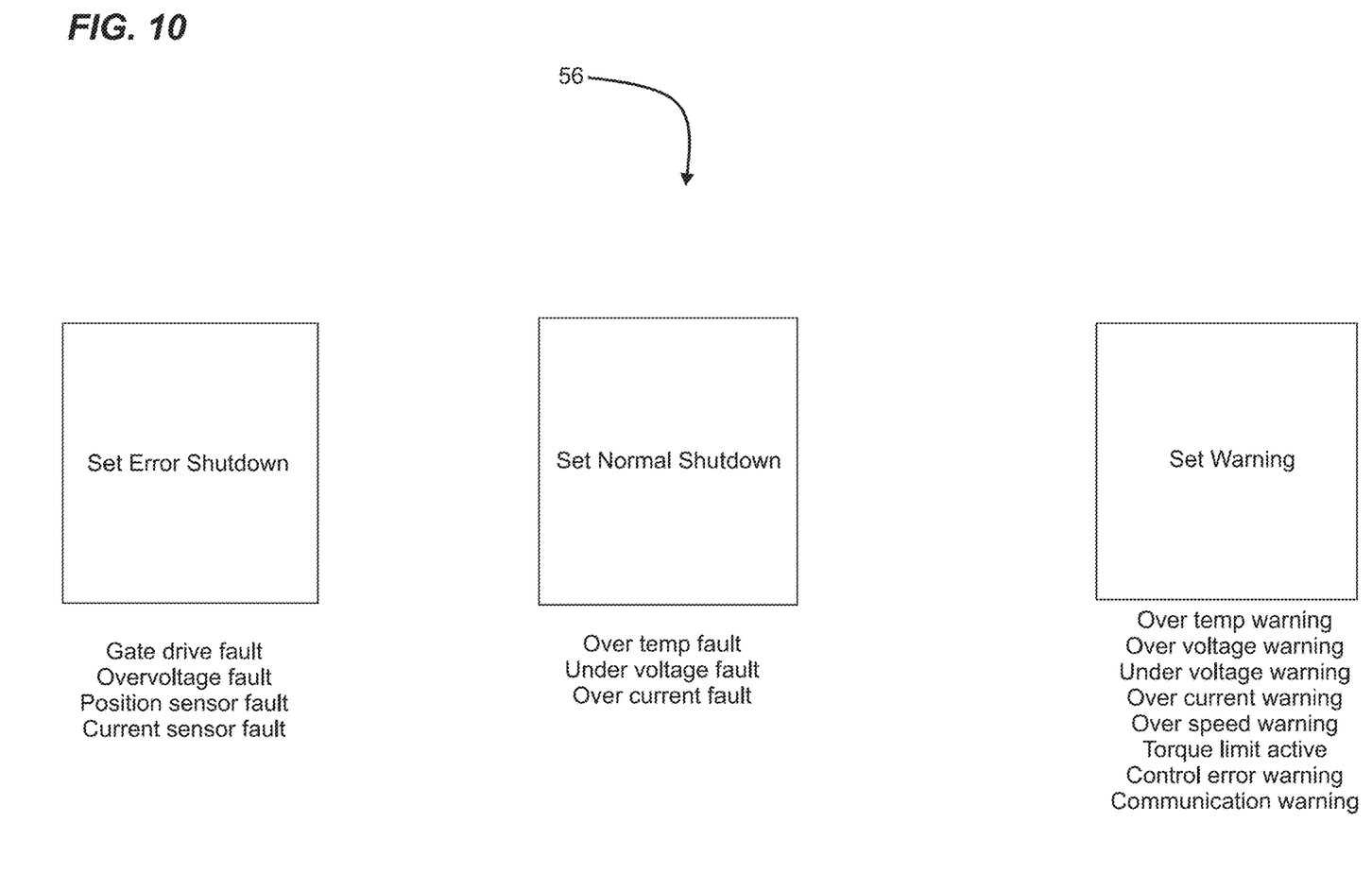
FIG. 10 is a diagram of types of fault codes and various procedures in response to the fault codes.

The control loop of the fault classification logic 56, as seen in FIG. 5, sets the various types of error signals in the system. Referring to FIG. 10, there are shown the categories of errors, the procedure followed by the controller (Error shut down, normal shutdown, and warning) and the various faults of each type. Error Shut down errors include Gate driver fault 84, Overvoltage fault 73, Position sensor fault 90 and Current sensor fault 82. Normal shutdown errors include over temp fault 89, under voltage fault 73 and over current fault 85. Warning types include Over temp warning 89, Over voltage warning 73, Under voltage warning 73, Over current warning 85, Over speed warning 88, Torque limit active 78, Control error warning 80, and Communication Warning 87.

Again referring to FIG. 5, the EGR Pump state machine includes multiple inputs including enable pin 94, CAN enable 96, received speed command 98, 48 V power 33, derate ratios 64, 66, fault status 92 and actual speed 76. The EGR control logic 58 includes multiple outputs EGR status 100, desired motor speed 102. The outputs are communicated to the ECU.

Referring to FIGS. 1-3, there is shown a control structure of the EGR pump system 21. The control structure includes sensors 28 that are in communication with the engine 10, electric motor 24, EGR pump or Roots device 20 and an EGR control unit in the inverter 26. The control structure includes sensors 28 capable of sensing conditions and of sending signals, such as temperature, pressure, speed, air flow, mass flow or volumetric flow, current and voltage. The control structure also includes an ECU or system controller 27 which includes a microprocessor, communication ports, memory, and programming and is linked with the sensors 28. The system controller 27 may be a portion of an engine control unit (ECU). The arrows indicate communication between the various components of the control structure.

Referring to FIG. 3, there is shown the EGR pump controller including inverter 26 which specifies a current output 108 to the electric motor to control EGR pump speed and therefore EGR mass flow rate. The EGR pump controller 26 includes temperature status detection and control logic 50, voltage status detection logic 52, control error detection logic 54, overspeed logic, error categorization logic 56, and EGR pump control logic 58, as described above.

The control structure may be utilized in a method of operating the exhaust gas recirculation pump for an internal combustion engine to provide a desired flow of EGR to the engine 20. The EGR control unit embodied in the inverter 26 may regulate the motor speed or torque in a feedback loop to control an EGR mass flow rate to the engine.

The method of operating an exhaust gas recirculation pump for an internal combustion engine includes: providing an EGR pump assembly including an electric motor coupled to a roots device having rotors, the EGR pump operably connected to an internal combustion engine; providing an system controller; providing an EGR control unit linked to the EGR pump assembly; sending a speed command from the system controller to the EGR control unit; determining if a motor temperature and module temperature is within a predetermined target; outputting a desired speed signal; determining if a motor speed is within a predetermined target; determining if motor torque is at maximum braking torque and at risk for exceeding a predetermined target determining if a motor voltage is within a predetermined target; and outputting a current to the electric motor controlling the speed of the electric motor and regulating an EGR mass flow rate.

The step of determining a motor temperature and module over temperature warning includes determining that the motor temperature and module temperature is less than or greater than a preset warning temperature. When the motor temperature or module temperature is greater than the warning temperature a warning signal is sent to the EGR control unit and system controller and the electric motor is derated lowering a current to the electric motor.

The step of determining a motor temperature and module over temperature fault includes determining that the motor temperature and module temperature is less than or greater than a preset limit temperature. When the motor temperature or module temperature is greater than the preset limit temperature an error signal is sent to the EGR control unit and system controller and the electric motor is set to a normal shutdown procedure where the motor is driven to zero rpm.

The step of determining a motor speed control error includes calculating a speed error by subtracting an actual speed of the motor from a desired speed of the motor and calculating a speed error threshold by multiplying the desired speed by a preset factor and determining that speed error is less than or greater than the speed error threshold. A preset constant value is used for the speed error threshold at low speed operation. When the speed error is greater than the allowable speed error factor and a torque limit active signal has been sent to the EGR control unit, a control error signal is sent to the EGR control unit and system controller. A time factor may be applied before sending the control error signal.

The step of determining a motor power supply under voltage warning includes determining that the motor voltage is less than a preset low warning voltage. When motor voltage is less than the low warning voltage a warning signal is sent to the EGR control unit and system controller.

The step of determining a motor power supply under voltage fault includes determining that the motor voltage is less than a preset low limit voltage. When the motor voltage is less than the preset low limit voltage an error signal is sent to the EGR control unit and system controller and the electric motor is set to a normal shutdown procedure where the motor is driven to zero rpm.

The step of determining a motor power supply over voltage warning includes determining that the motor voltage is greater than a preset high warning voltage. When motor voltage is greater than the high warning voltage a warning signal is sent to the EGR control unit and system controller.

The step of determining a motor power supply over voltage fault includes determining that the motor voltage is greater than a preset high limit voltage. When the motor voltage is greater than the preset high limit voltage an error signal is sent to the EGR control unit and system controller and the electric motor is set to an error shutdown procedure with a three phase short of the electric motor.

The step of determining an overspeed warning includes determining that the motor is in a condition where it is providing maximum braking torque and at a high risk of overspeeding. This done by checking that the motor acting in the direction to slow down pump rotation and that it is outputting maximum calibrated braking torque. The overspeed warning is also set when motor speed measures above an over speed limit.

A method of operating exhaust gas recirculation pump for an internal combustion engine also includes: providing an EGR pump assembly including an electric motor coupled to a roots device having rotors, the EGR pump operably connected to an internal combustion engine; providing an system controller; providing an EGR control unit linked to the EGR pump assembly; sending a signal in the EGR control unit from a battery off state to a power on state to place the electric motor in an initialization state where the electric motor communicates with the EGR control unit; sending an enable signal to the electric motor placing the electric motor in a standby state wherein the electric motor is three phase shorted; sending a CAN enable signal to the electric motor placing the electric motor in an enabled state; sending a speed command from the system controller to the EGR control unit defining a speed set point; outputting a current to the electric motor maintaining the setpoint and regulating an EGR mass flow rate.

The method of operating an exhaust gas recirculation pump further includes determining if a fault code has been generated in the EGR control unit. When a fault code is generated it is classified as a warning, normal shutdown or error shutdown signal in the EGR control unit. When a CAN enable or enable signal is turned off or a normal shutdown fault is received the electric motor is driven to zero rpm. When an error shutdown signal is received the electric motor is three phase shorted.

Referring to FIG. 12, the method of operating exhaust gas recirculation pump for an internal combustion engine includes: providing an EGR pump assembly including an electric motor coupled to a roots device having rotors, the EGR pump operably connected to an internal combustion engine; providing a system controller 27; providing an EGR control unit 26 linked to the EGR pump assembly; sending a torque command 99 from the system controller 27 to the EGR control unit 26 defining a torque set point; and outputting a current 108 to the electric motor maintaining the torque set point and regulating an EGR mass flow rate.

We claim:

1. A method of operating an exhaust gas recirculation (EGR) pump for an internal combustion engine comprising:
   providing an EGR pump assembly including an electric motor coupled to a roots device having rotors, the EGR pump operably connected to an internal combustion engine;
   providing a system controller;
   providing an EGR control unit linked to the EGR pump assembly;
   sending a speed command from the system controller to the EGR control unit;
   determining if a motor temperature and a module temperature are within a predetermined target;
   outputting a desired speed signal;
   determining if a motor speed is within a predetermined target;
   determining if a motor voltage is within a predetermined target;
   outputting a current to the electric motor controlling the speed of the electric motor and regulating an EGR mass flow rate.

2. The method of operating an exhaust gas recirculation pump of claim 1, wherein the step of determining a motor temperature and a module temperature includes determining that the motor temperature and the module temperature is less than or greater than a preset warning temperature.

3. The method of operating an exhaust gas recirculation pump of claim 2, wherein when the motor temperature or module temperature is greater than the warning temperature, a warning signal is sent to the EGR control unit and system controller and the electric motor is derated lowering a current to the electric motor.

4. The method of operating an exhaust gas recirculation pump of claim 1, wherein the step of determining a motor temperature and module temperature includes determining that the motor temperature and the module temperature are less than or greater than a preset limit temperature.

5. The method of operating an exhaust gas recirculation pump of claim 4, wherein when the motor temperature or module temperature is greater than the preset limit temperature, an error signal is sent to the EGR control unit and system controller and the electric motor is set to a normal shutdown procedure where the motor is driven to zero rpm.

6. The method of operating an exhaust gas recirculation pump of claim 1, wherein the step of determining a motor speed includes calculating a speed error by subtracting an actual speed of the motor from a desired speed of the motor and calculating a speed error threshold by multiplying the desired speed by a preset factor and determining that the speed error is less than or greater than the speed error threshold.

7. The method of operating an exhaust gas recirculation pump of claim 6, wherein when the speed error is greater than the allowable speed error threshold and a torque limit active signal has been sent to the EGR control unit, a control error signal is sent to the EGR control unit and system controller and the electric motor is set to a normal shutdown procedure where the motor is driven to zero rpm.

8. The method of operating an exhaust gas recirculation pump of claim 7, further including applying a time factor before sending the control error signal.

9. The method of operating an exhaust gas recirculation pump of claim 1, wherein the step of determining a motor voltage includes determining that the motor voltage is less than a preset low warning voltage.

10. The method of operating an exhaust gas recirculation pump of claim 9, wherein when the motor voltage is less than the low warning voltage, a warning signal is sent to the EGR control unit and system controller.

11. The method of operating an exhaust gas recirculation pump of claim 1, wherein the step of determining a motor voltage includes determining that the motor voltage is less than a preset low limit voltage.

12. The method of operating an exhaust gas recirculation pump of claim 11, wherein when the motor voltage is less than the preset low limit voltage, an error signal is sent to the EGR control unit and system controller and the electric motor is set to a normal shutdown procedure where the motor is driven to zero rpm.

13. The method of operating an exhaust gas recirculation pump of claim 1, wherein the step of determining a motor voltage includes determining that the motor voltage is greater than a preset high warning voltage.

14. The method of operating an exhaust gas recirculation pump of claim 13, wherein when the motor voltage is greater than the high warning voltage, a warning signal is sent to the EGR control unit and system controller.

15. The method of operating an exhaust gas recirculation pump of claim 1, wherein the step of determining a motor voltage includes determining that the motor voltage is greater than a preset high limit voltage.

16. The method of operating an exhaust gas recirculation pump of claim 15, wherein when the motor voltage is greater than the preset high limit voltage, an error signal is sent to the EGR control unit and system controller and the electric motor is set to an error shutdown procedure with a three phase short of the electric motor.

* * * * *